United States Patent
McPhee et al.

(10) Patent No.: US 12,044,264 B2
(45) Date of Patent: Jul. 23, 2024

(54) METHOD AND APPARATUS FOR FASTENING IN A HIGH FLUID PRESSURE ENVIRONMENT

(71) Applicant: NORD-LOCK SWITZERLAND GMBH, Gallenkappel (CH)

(72) Inventors: Andrew Duncan McPhee, Red Hill (AU); Adam Glenn Lutty, Red Hill (AU)

(73) Assignee: Nord-Lock Switzerland GmbH, St. Gallenkappel (CH)

( * ) Notice: Subject to any disclaimer, the term of this patent is extended or adjusted under 35 U.S.C. 154(b) by 0 days.

(21) Appl. No.: 18/017,350

(22) PCT Filed: Jul. 21, 2021

(86) PCT No.: PCT/AU2021/050783
§ 371 (c)(1),
(2) Date: Jan. 20, 2023

(87) PCT Pub. No.: WO2022/016217
PCT Pub. Date: Jan. 27, 2022

(65) Prior Publication Data
US 2023/0184282 A1 Jun. 15, 2023

Related U.S. Application Data

(60) Provisional application No. 63/054,471, filed on Jul. 21, 2020.

(51) Int. Cl.
B25B 29/02 (2006.01)
B23P 19/06 (2006.01)
(Continued)

(52) U.S. Cl.
CPC ............ *F16B 31/04* (2013.01); *B23P 19/067* (2013.01); *B25B 29/02* (2013.01); *F16B 5/025* (2013.01); *F16B 31/043* (2013.01)

(58) Field of Classification Search
CPC ....... B23P 19/067; B25B 29/02; F16B 31/043
See application file for complete search history.

(56) References Cited

U.S. PATENT DOCUMENTS

RE33,490 E * 12/1990 Steinbock ................. F16D 1/06
411/432
10,422,225 B2 9/2019 Hofsommer et al.
(Continued)

FOREIGN PATENT DOCUMENTS

| EP | 1105250 B1 | 6/2011 |
|---|---|---|
| WO | 2019126426 A1 | 6/2019 |
| WO | 2020077396 A1 | 4/2020 |

OTHER PUBLICATIONS

International Search Report and Written Opinion for Application No. PCT/AU2021/050783 dated Sep. 15, 2021 (10 pages).
(Continued)

*Primary Examiner* — Jermie E Cozart
(74) *Attorney, Agent, or Firm* — Knobbe, Martens, Olson & Bear, LLP

(57) ABSTRACT

The present invention relates to a multi jackbolt tensioner and methods of using the same. The present invention alleviates some of the problems associated with presently available multi jackbolt tensioners.

16 Claims, 14 Drawing Sheets

(51) Int. Cl.
*F16B 5/02* (2006.01)
*F16B 31/04* (2006.01)

(56) References Cited

U.S. PATENT DOCUMENTS

| | | | |
|---|---|---|---|
| 2005/0058520 A1* | 3/2005 | Ricker | F16B 31/02 |
| | | | 411/14 |
| 2014/0348613 A1* | 11/2014 | Davis | F16B 31/043 |
| | | | 411/330 |
| 2019/0120281 A1 | 4/2019 | Lutter | |

OTHER PUBLICATIONS

International Preliminary Report on Patentability for Application No. PCT/AU2021/050783 dated Jun. 21, 2022 (16 pages).

* cited by examiner

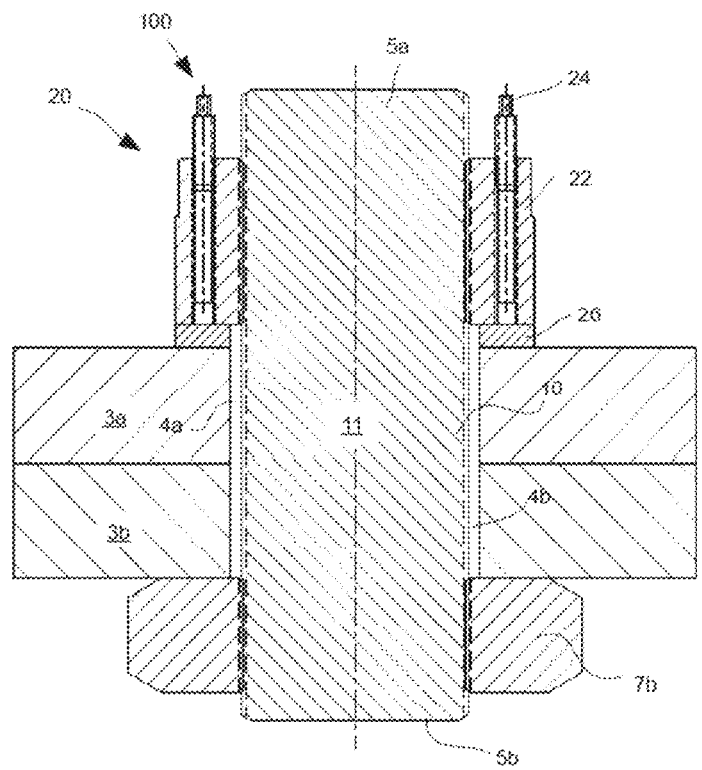
Prior Art  FIG 3
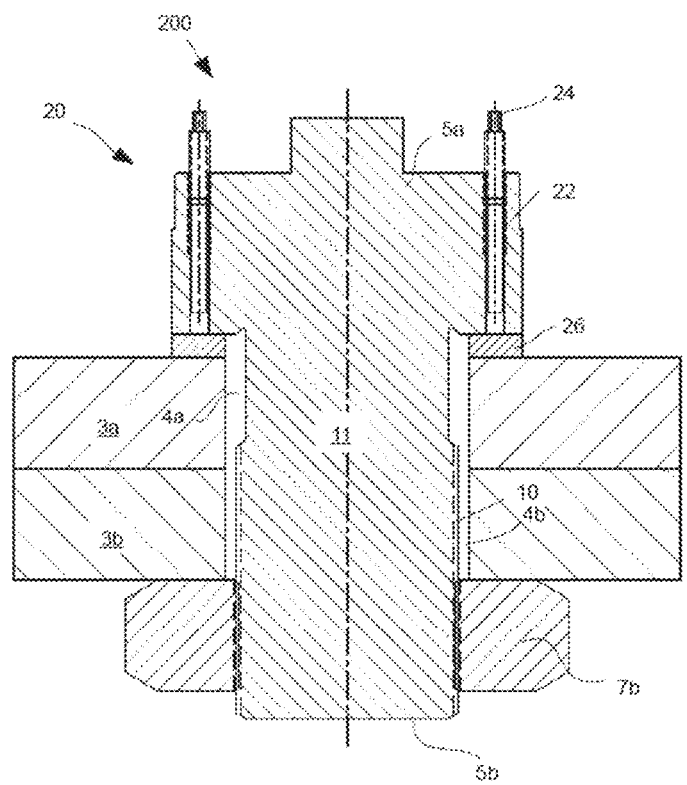
Prior Art  FIG 4

METHOD AND APPARATUS FOR FASTENING IN A HIGH FLUID PRESSURE ENVIRONMENT

CROSS-REFERENCE TO RELATED APPLICATION(S)

This application is a U.S. national stage entry of International Patent Application No. PCT/AU2021/050783, filed on Jul. 21, 2021, which claims priority to U.S. Provisional Patent Application No. 63/054,471, filed on Jul. 21, 2020, the entire contents of each of which are fully incorporated herein by reference.

The present disclosure generally relates to elongate fastening members such as bolts and studs and to apparatus for tensioning such fasteners.

BACKGROUND

Any references to methods, apparatus or documents of the prior art are not to be taken as constituting any evidence or admission that they formed, or form part of the common general knowledge.

FIG. 1 shows an elongate fastening member in the form of a stud 1 projecting from a structural member in the form of a workpiece being a flange 3a. More specifically the stud 1 is used, in conjunction with nuts 7a and 7b to join two parts, being the flange 3a and an adjacent flange 3b together. In use, the two flanges 3a and 3b are subject to a workload, indicated by arrows 8 that tends to pull the two flanges 3a and 3b apart. In order to counteract the workload 8 the stud 1 is inserted through corresponding holes 4a, 4b of each of the two flanges 3a, 3b. The stud 1 has male threaded ends 5a, 5b which are each mated with a corresponding female thread of hex nuts 7a, 7b. The hex nuts 7a, 7b are each oversized relative to holes 4a, 4b. Consequently, torqueing the hex nuts 7a, 7b generates an axial tension in the stud 1 in the form of a preload, indicated by arrow 9, that stretches the shank 11 of the stud 1. In response a compressive clamping force, indicated by arrows 13 presses the parts 3a, 3b together. To maintain joint integrity the preload 9 (and thus the clamping force 13) must be greater than the workload 8.

It will be realized that where very high workloads are encountered, for example in nuclear reactors, steam turbines, wind turbines and the like, then the preload that must be generated in a stud or bolt must be very great too since it must exceed the foreseeable workload.

It has been found that when torqueing a conventional nut, such as nuts 7a, 7b of FIG. 1, that approximately 90% of the applied torque is absorbed by friction between the nut and the workpiece and by friction between the thread of the elongate fastening member and the nut so that only 10% of the applied torque is converted into the preload that is developed along the shank of the fastener. Consequently, in very high preload applications it has been necessary to use high power tools and/or long handle wrenches and hammers to apply a sufficient level of torqueing to attain the desired preload.

Multi Jackbolt Tensioners (MJTs) were developed in response to the difficulties that have been encountered when seeking to generate sufficiently high preloads using conventional nuts.

A MJT may be used as a direct replacement for conventional nuts and bolts. FIG. 2 depicts a partially cutaway nut-style MJT 20. FIG. 3 shows the MJT 100 in use. The MJT 100 comprises an example of a body 22. The body 22 of the MJT 100 is formed with a threaded central hole 18 to receive a bolt, shaft, or stud. A polar array of threaded jackbolt holes 19, each disposed on a circle concentric with the central hole, pass though the body 22. Corresponding jackbolts 24 traverse the jackbolt holes 19 and are threadedly received therein. The MJT 100 further includes a load bearing member in the form of a hardened washer 26 against which points 29 of the jackbolts 24 abut in use. The hardened washer 26 bears against a structural member being fastened.

By torqueing the jackbolts 24 a strong axial force is generated and directed against the hardened washer 26. The thrust force of the jackbolts 24 and the opposite reaction force of the opposing nut 7b or bolt head impose a strong clamping force on the flanges 3a, 3b. The advantage of the MJT is that huge clamping forces can be generated with a fraction of the torque input that would be required if a single conventional nut were used. For example, for a fastener with a thread diameter of 160 mm approximately 100 kNm of torque is required to generate 310 Mpa of bolt stress. In contrast the same amount of bolt stress can be generated by torqueing jackbolts of a twenty-four jackbolt MJT to approximately 1 kNm of torque each. Consequently, hand tools can be used to suitably torque the jackbolts of an MJT for tensioning a stud/bolt of any diameter. Bolt-style MJTs are also available as illustrated in FIG. 4, which depicts a bolt-style MJT 200. The stud 11 is not threaded into the body 22 but rather an end of the stud 5a is integrally formed therewith so that an integrally formed shank 10 extends from the body 22 with a threaded end 5b for receiving a conventional nut 7b or for insertion into a threaded bore of a structural member.

Preload accuracy using MJTs is improved over conventional bolting methods in several ways:
  Preload accuracy of ±5-10% is possible in contrast to ±40-50% for a conventional nut and bolt.
  Jackbolts generally have rolled threads to improve repeatability of the friction factor.
  Multiple jackbolts have an averaging effect, thus reducing overall scatter.
  There is a large hardness spread between jackbolt and body threads.
  MJTs provide uniform gasket crush.
  MJTs eliminate leakage challenges.
  Multiple MJTs may be utilized in compressing a first workpiece to a second workpiece, as shown in FIG. 5. As shown, hydraulic pressure may be utilized to apply pressure to the MJTs.

Although MJTs are a great improvement over conventional nuts for high preload applications, nevertheless the Inventor has observed that for high temperature, highly loaded fastened connections, such as gas turbine, steam turbine, and centrifugal compressor flanges, the studs and nuts need to be designed to withstand the effects of creep, corrosion, and lubricant degradation. Creep, corrosion, and lubricant degradation are failure mechanisms mostly affecting the jackbolts of an MJT during operation at high temperature and high load.

It is an object of the present invention to provide a method and apparatus for tensioning an elongate fastening member such as a stud or a bolt that overcomes or at least ameliorates one or more of the problems that have been described, or to at least provide a commercial alternative to the consumer.

SUMMARY

In a first aspect, although it need not be the broadest or indeed the only aspect, the invention resides in a multi jackbolt tensioner comprising:

a body portion formed to engage an elongate fastening member or integrally formed therewith, the body portion having a plurality of holes spaced uniformly from a longitudinal central axis at spaced apart locations about an outer periphery thereof, the holes having sidewalls formed with body threads;

jackbolts each including a body having threads to threadedly engage the body threads in one of the holes in the body portion; and a load bearing member for applying force to a workpiece to be fastened and arranged for locating about the elongate fastening member, wherein the load bearing member comprising a first annular face connected to a second annular face by an inner wall and an outer wall, and a cylindrical lip projecting from the first annular face, wherein the cylindrical lip comprises a wall that is continuous with the inner wall.

In one embodiment, the body portion is formed with an axial aperture to threadedly engage the elongate fastening member. In one embodiment, the axial aperture is closed at an end thereof.

In an embodiment, the body portion is integrally formed with the elongate fastening member.

In one embodiment, the wall projects slightly away from a plane of the inner wall.

In one embodiment, the cylindrical lip comprises a second wall. In an embodiment, the second wall projects away from the first annular face. In certain embodiments, the second wall is inclined towards the wall. In some embodiments, the wall and second wall are connected by a surface.

In an embodiment, the load bearing member is integrally formed.

In certain embodiments, the load bearing member further comprises a concentric protrusion. The concentric protrusion projects from the first annular face. The concentric protrusion is located between the inner wall and the outer wall. In one embodiment, the concentric protrusion has a circular shape that is substantially equidistant to the inner wall. In one embodiment, the concentric protrusion is not equidistant from both the inner wall and outer wall.

In certain embodiments, the load bearing member further comprises a second concentric protrusion that projects from the second annular face. The second concentric protrusion is located between the inner wall and the outer wall. In one embodiment, the second concentric protrusion has a circular shape that is equidistant to the inner wall. In one embodiment, the second concentric protrusion is adjacent the inner wall. In another embodiment, the second concentric protrusion is adjacent the outer wall.

In certain embodiments, the load bearing member comprises a first concentric protrusion projecting from the first annular face and a second concentric protrusion projecting from the second annular face.

In an embodiment, the cylindrical lip is adapted to form a seal with the first workpiece, the body portion, the jackbolt and/or the elongate fastening member. In some embodiments, the cylindrical lip is adapted to form a seal with the first workpiece. In embodiments, the cylindrical lip is adapted to form a seal with the body portion. In an embodiment, the cylindrical lip is adapted to form a seal with the jackbolt(s). In one embodiment, the cylindrical lip is adapted to form a seal with the elongate fastening member. In another aspect, the invention resides in a method of compressing a first workpiece and a second workpiece together including the steps of:

locating a load bearing member on the first workpiece, the load bearing member comprising a first annular face connected to a second annular face by an inner wall and an outer wall, and a cylindrical lip projecting from the first annular face, wherein the cylindrical lip comprises a wall that is continuous with the inner wall;

locating a body portion on the load bearing member, wherein the body portion engages an elongate fastening member or is integrally formed therewith, the body portion having a plurality of holes spaced uniformly from a longitudinal central axis at spaced apart locations about an outer periphery thereof, the holes having sidewalls formed with body threads, capturing the elongate fastening member on an outer side of the second workpiece;

coupling jackbolts including a body having threads to threadedly engage the body threads in each of the holes in the body portion;

tensioning the jackbolts, to thereby compress the first and second workpieces towards each other, wherein the cylindrical lip cooperates with elongate fastening member to form a seal therebetween.

The MJT, body portion and load bearing member may be substantially as described for the first aspect.

In one embodiment, the method further includes the step of applying hydraulic pressure to compress the first workpiece and the second workpiece. In a further embodiment, the method further includes the step of releasing the hydraulic pressure after the tensioning the jackbolts step.

In a second aspect, the invention resides in a multi jackbolt tensioner comprising:

a body portion formed to engage an elongate fastening member or integrally formed therewith, the body portion having a plurality of holes spaced uniformly from a longitudinal central axis at spaced apart locations about an outer periphery thereof, the holes having sidewalls formed with body threads, wherein a base of the body portion comprises a cylindrical lip protrusion;

jackbolts each including a body having threads to threadedly engage the body threads in one of the holes in the body portion; and an annular load bearing member for applying force to a workpiece to be fastened and arranged for locating about the elongate fastening member, wherein the cylindrical lip protrusion is adapted to locate with the annular load bearing member.

In one embodiment, the body portion is formed with an axial aperture to threadedly engage the elongate fastening member. In one embodiment, the axial aperture is closed at an end thereof.

In some embodiments, the cylindrical lip is adapted to form a seal with a first workpiece and/or the elongate fastening member. In embodiments, the cylindrical lip is adapted to form a seal with the first workpiece. In one embodiment, the cylindrical lip is adapted to form a seal with the elongate fastening member.

In another aspect, the invention resides in a method of compressing a first workpiece and a second workpiece together including the steps of:

locating an annular load bearing member on the first workpiece, locating a body portion on the load bearing member, wherein the body portion is formed to engage an elongate fastening member or integrally formed therewith, the body portion having a plurality of holes spaced uniformly from a longitudinal central axis at spaced apart locations about an outer periphery thereof, the holes having sidewalls formed with body threads, wherein an underside of a base of the body portion comprises a cylindrical lip protrusion that abuts the annular load bearing washer, capturing the elongate fastening member on an outer side of the second workpiece;

coupling jackbolts including a body having threads to threadedly engage the body threads in each of the holes in the body portion;

tensioning the jackbolts, to thereby compress the first and second workpieces towards each other, wherein the cylindrical lip cooperates with load bearing member and elongate fastening member to form a seal therebetween.

The MJT, body portion and load bearing member are as substantially described for the second aspect.

In one embodiment, the body portion is formed with an axial aperture to threadedly engage the elongate fastening member.

In an embodiment, the body portion is integrally formed with the elongate fastening member.

In one embodiment, the method further includes the step of applying hydraulic pressure to compress the first workpiece and the second workpiece. In a further embodiment, the method further includes the step of releasing the hydraulic pressure after the tensioning the jackbolts step.

In one embodiment, the invention resides in a method of sealing a gas turbine including the steps of:

placing a metal insert over adjacent surfaces in the gas turbine;

compressing the adjacent surfaces by tensioning one or more MJTs mentioned herein;

to thereby seal a gas turbine.

The method may further include the step of dimensioning the metal insert such that it fits tightly between the adjacent surfaces.

DESCRIPTION OF FIGURES

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The embodiments described herein may be better understood by reference to the accompanying figures, in which:

FIG. 3 shows a prior art MJT;

FIG. 4 shows a prior art bolt-style MJT;

DETAILED DESCRIPTION

Figure 1:
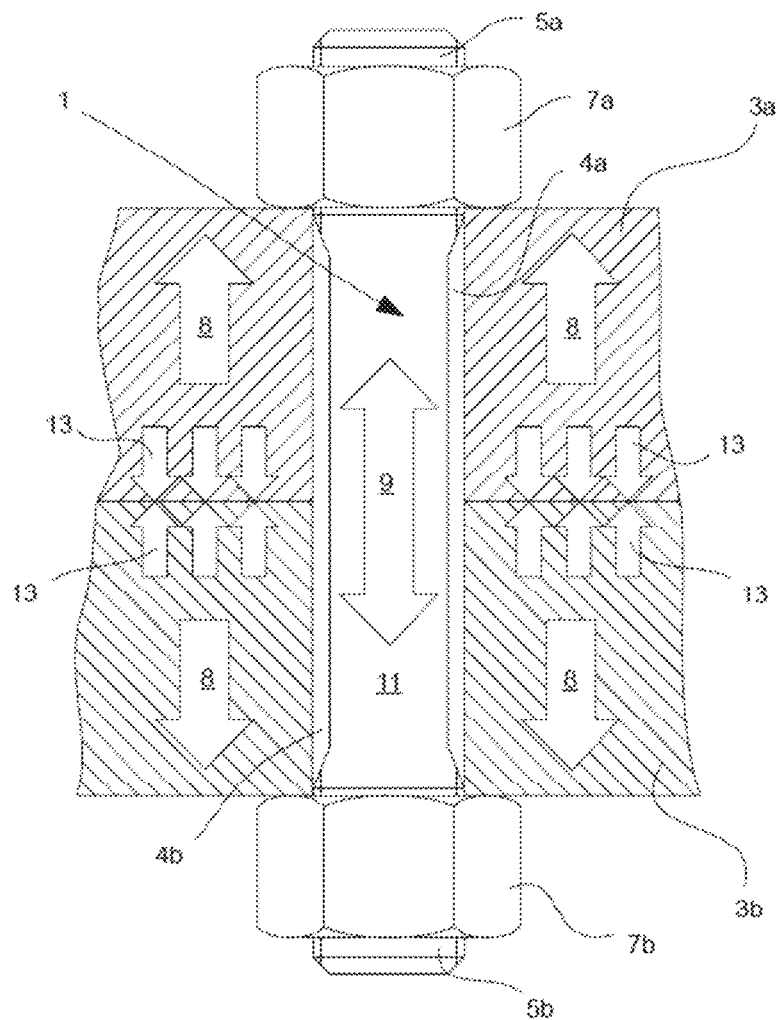
FIG. 1 shows a prior art elongate fastening member projecting from a structural member in the form of flange.
Figure 2:
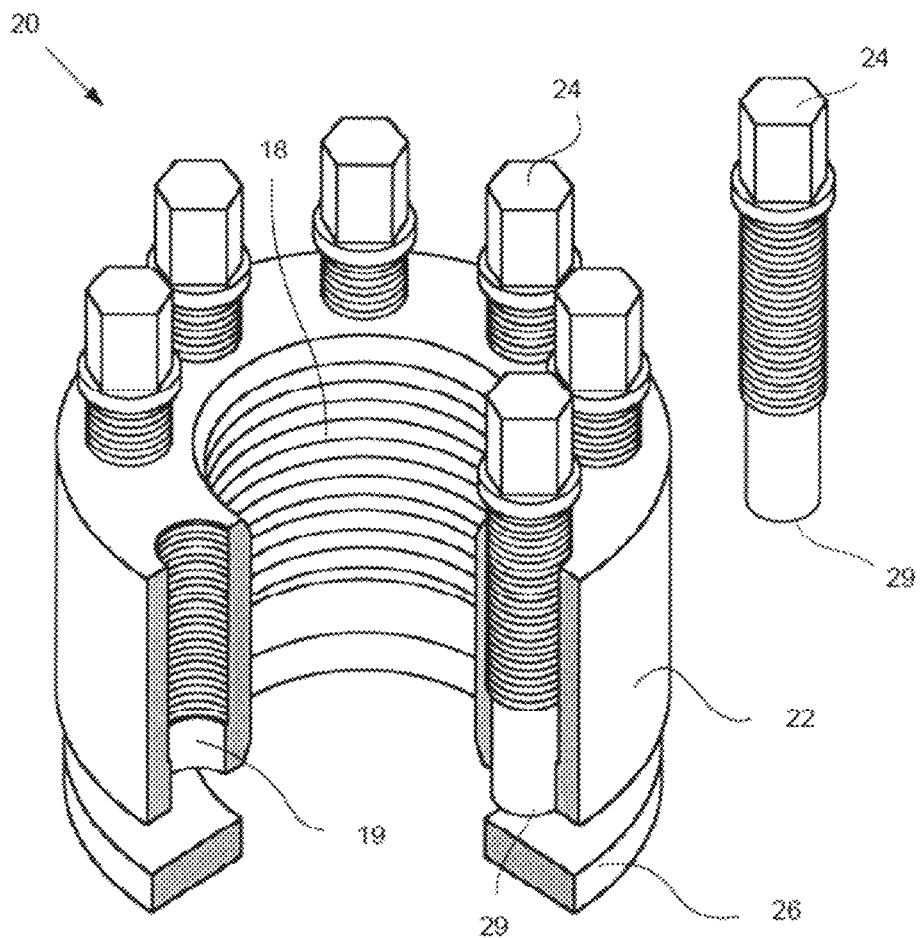
FIG. 2 depicts a partially cut away prior art nut-style MJT.
Figure 5:
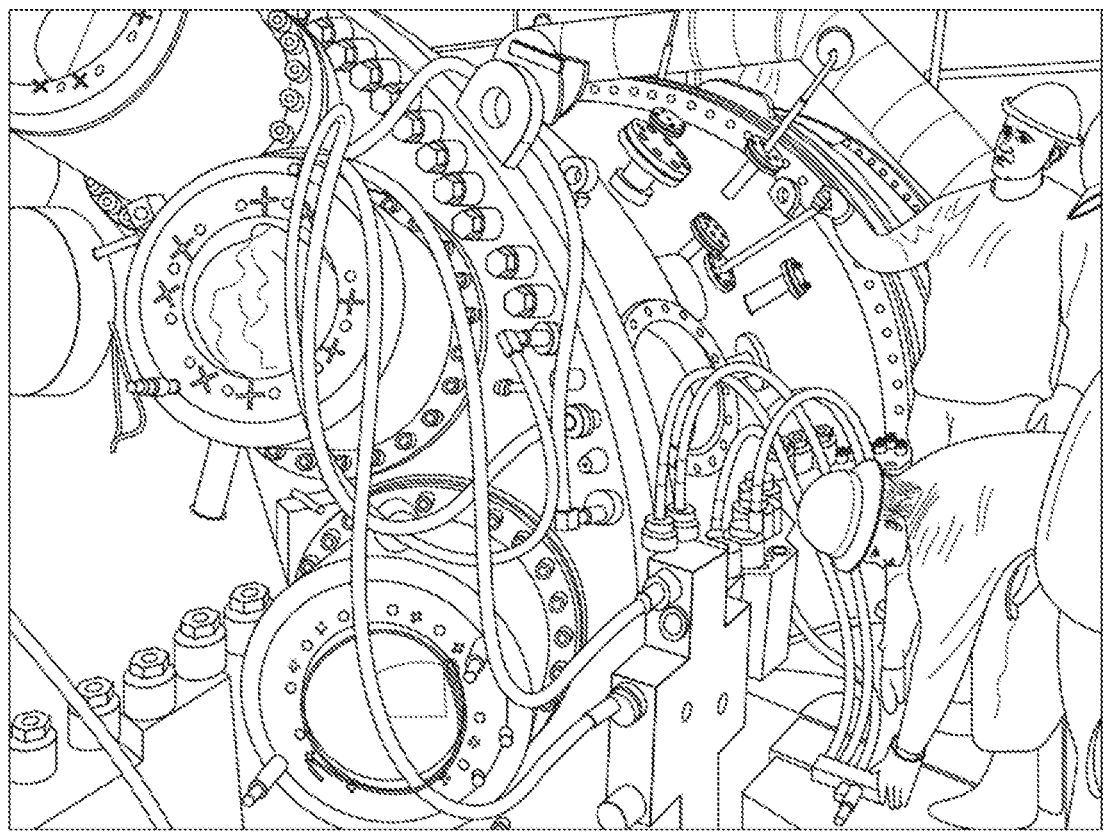
FIG. 5 shows multiple MJTs being utilized to compress a first workpiece and second workpiece.

For ease of description, the present invention has been described in relation to a multi jackbolt tensioner.

Multi jackbolt tensioners (MJT) may be used for tightening bolts, shafts or studs in the oil, gas, energy, transportation and mining industries. MJT's are suitably utilized in high pressure environments. A non-limiting example of a high pressure environment is in the use of turbines. In this regard, gas turbines are generally assembled from constituent parts and are required to be substantially gastight, otherwise a loss of efficiency may be experienced. To this end, flanges of turbine bodies are typically compressed together with MJTs to form a gas tight seal therebetween.

However, the flanges and MJTs can be subjected to high pressure and temperatures which can lead to warping thereof. When warping occurs, the seal between flanges and/or MJTs may no longer sealingly engage one another and result in a loss of a gastight seal. As such, the gas within the turbine body may escape between these compromised seals and result in a loss of efficiency or operation. Major points in which gas may escape into the atmosphere are between the body portion of a MJT and the load bearing member, or between the jackbolt and jackbolt holes.

The present invention is predicated on the finding that the provision of a particular load bearing member with a MJT or a particular body portion of a MJT can, at least, alleviate the issue of loss of a gastight seal.

In a first aspect, although it need not be the only or indeed the broadest aspect, the invention resides in a multi jackbolt tensioner comprising:

a body portion formed to engage an elongate fastening member or integrally formed therewith, the body portion having a plurality of holes spaced uniformly from a longitudinal central axis at spaced apart locations about an outer periphery thereof, the holes having sidewalls formed with body threads;

jackbolts each including a body having threads to threadedly engage the body threads in one of the holes in the body portion; and a load bearing member for applying force to a workpiece to be fastened and arranged for locating about the elongate fastening member, wherein the load bearing member comprising a first annular face connected to a second annular face by an inner wall and an outer wall, and a cylindrical lip projecting from the first annular face, wherein the cylindrical lip comprises a wall that is continuous with the inner wall.

One disadvantage of presently available MJTs is that the interface between the loading bearing member and the body portion of the MJT can provide a gas release point. Furthermore, in the instance of the elongate fastening member not being integrally formed with the body portion of the MJT, the interface between the threaded central hole and the elongate fastening member can also provide an additional gas release point. Additionally, as mentioned above, the creep, corrosion and lubricant degradation can affect the jackbolts and this can lead to a loss of seal between the jackbolt and holes in the body portion. Furthermore, the interface between the load bearing member and body can also provide an additional gas release point. In addition to the above, the interface between the load bearing member and the load bearing member and a workpiece can also provide another an additional gas release point. The present invention alleviates these issues by providing a further gastight seal to prevent gas release through these interfaces.

The present invention utilizes a load bearing member that not only forms a gastight seal between the workpiece (such as a flange) and the body portion of the MJT, but the load bearing member also forms a gas tight seal between the elongate fastening member and the workpiece. Typically, the elongate fastening member comprises a stud and a shank that extends between aligned apertures in the workpieces to be compressed. This provides a seal between the workpiece, elongate fastening member and load bearing member and this alleviates the issue of gas escaping from the volume between the elongate fastening member and the workpiece.

The use of a load bearing member comprising a first annular face connected to a second annular face by an inner wall and an outer wall, and a cylindrical lip projecting from the first annular face, wherein the cylindrical lip comprises a wall that is continuous with the inner wall in a MJT allows a seal to be formed between the body portion of the MJT and the workpiece, and also between the workpiece and the elongate fastening member. The annular body of the loading bearing member engages the body portion of the MJT and the flange to form a seal therebetween. The cylindrical lip of the load bearing member also engages the elongate fastening member to form a seal therebetween.

The cylindrical lip projecting from the first annular face engages the elongate fastening member and forms a seal between the elongate fastening member and the workpiece. It will be appreciated that this seal provides a further barrier between the volume between the elongate fastening member and workpiece, and any weakness in a seal between the load bearing member and the body portion, the jackbolt and the jackbolt holes, and/or the body portion and the elongate fastening member (if appropriate).

In one embodiment, the load bearing member is in the form of a washer. In one embodiment, the load bearing member is integrally formed. That is, the body and cylindrical lip are formed of a unitary material. As used herein, the term 'integrally formed' refers to being formed of a single piece of material. In one embodiment, the load bearing member is formed of hardened steel.

The cylindrical lip projecting from the first annular face also advantageously assists in maintaining a location of the load bearing member relative to the elongate fastening member and workpiece.

Figure 6:
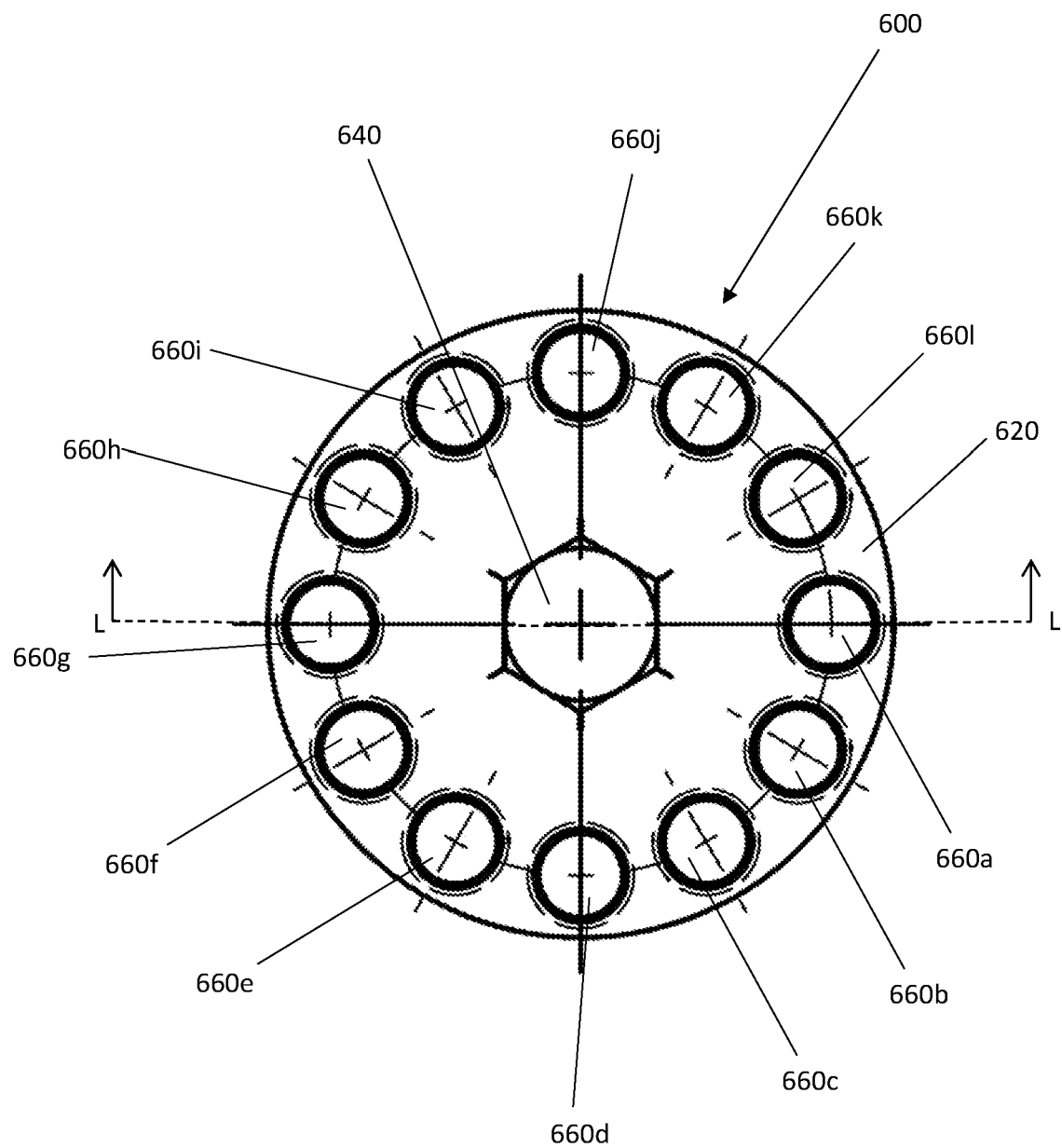
FIG. 6 shows a top plan view on an embodiment of the MJT.

FIG. 6 is shows a top plan view of an exemplary MJT. MJT 600 comprises a body portion 620. In the embodiment shown, the body portion 620 is integrally formed with a tightening nut 640.

The body portion 620 is formed with a concentric circular array of threaded jackbolt holes 660*a*-660*l* therethrough. Through each of the threaded jackbolt holes 660*a*-660*l* passes a corresponding one of a plurality of jackbolts 662*a*-*l*. In the embodiment shown, there are twelve (12) jackbolts 662*a*-*l* and corresponding twelve (12) jackbolt holes 660*a*-660*l*. However, the person skilled in the art will appreciate that any number of jackbolts and jackbolt holes may be utilized. In one embodiment, the number of jackbolts and jackbolt holes is 2, 3, 4, 5, 6, 7, 8, 9, 10, 11, 12 . . . n (wherein n is an integer greater than 12).

Figure 7:
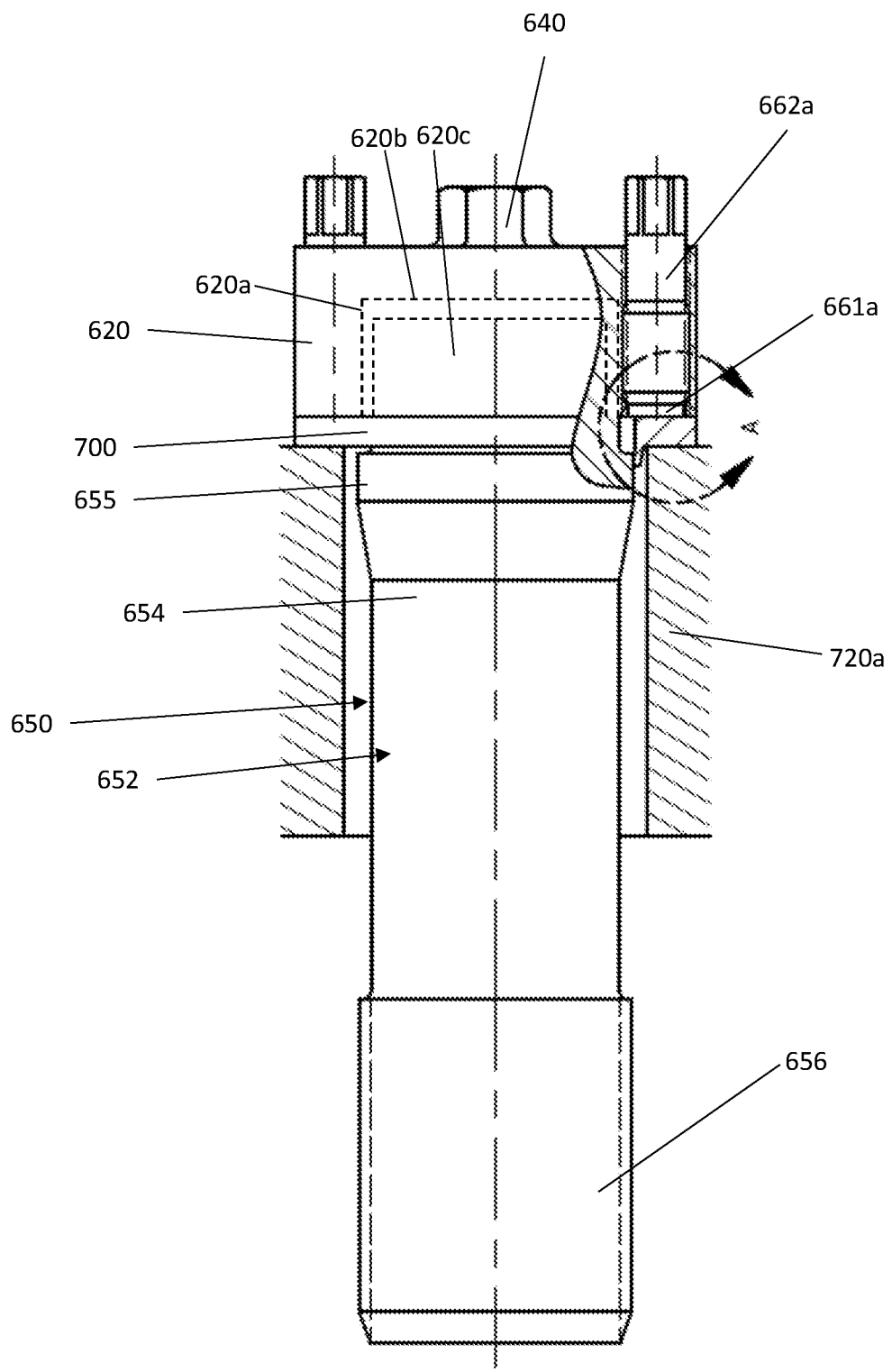
FIG. 7 shows a cross-sectional view through line L-L of the MJT depicted in FIG. 6.

A partially cutaway cross-sectional view through the line L-L of MJT 600 is shown in FIG. 7. The body portion 620 sits upon a load bearing member 700. In one embodiment, the body portion abuts the load bearing member. The load bearing member 700 sits upon a flange 720*a* of a first workpiece. In an embodiment, the load bearing member abuts a flange of a first workpiece. The flange 720*a* sits on top a flange of a second workpiece (not shown). A jackbolt 662*a* is inserted through a threaded jackbolt hole 620*a*. The jackbolt 662*a*-*l* comprises a male thread which engages the female threaded jackbolt hole 660*a*-*l*. As the jackbolt 662 is inserted into the jackbolt hole 660, the jackbolt 662 extends beyond the end of the jackbolt hole 660. The jackbolt 662 may comprise a point 661 which applies a force on a load bearing member 700. The point 661 is suitably a flat surface that abuts the load bearing member 700. As the jackbolt 662 is tensioned in the jackbolt hole 660, the point 661 applies force to the load bearing member 700. The load bearing member 700 in turn applies a force on the workpieces, such as a flange. The two workpieces are then compressed together to form a seal therebetween.

The partially cutaway cross-sectional view of MJT 600 shown in FIG. 7 also shows opening or aperture 620*a* formed therein. The opening or aperture 620*a* is closed at one end thereof 620*b*. The side walls of the aperture 620*a* is formed with a female thread (not shown). The male threaded top of stud 620*c* is adapted to engage the female thread of the opening or aperture 620*a*. This embodiment is particularly useful in high pressure environments because there is no interface between the elongate fastening member and body portion in which gas can escape into the atmosphere.

The elongate fastening member 650 suitably comprises a stud 652 comprising a shank 654. The shank 654 comprises an enlarged portion 655 which has a greater diameter than the remaining portion of the shank 654. The enlarged portion 655 may abut the load bearing member 700 to form a seal therebetween, and this is discussed in more detail hereinafter. The elongate fastening member 650 further comprises a male threaded portion 656. The male threaded portion 656 is adapted to receive a bolt and optionally a washer (not shown) which may be captured on the outside of a second workpiece.

In one embodiment, the jackbolt has a plasmabond finish. The plasmabond finish advantageously allows for efficient lubrication.

In an embodiment, the elongate fastening member bolt has a kolsterising finish. Kolsterising finish is utilized to enhance the mechanical tribological properties of the elongate fastening member. Kolsterising improves mechanical and wear properties without corrosion resistance loss, which is particularly beneficial to the present invention. This minimizes delamination and metal debris and thus improves wear resistance and fatigue strength.

Figure 8:
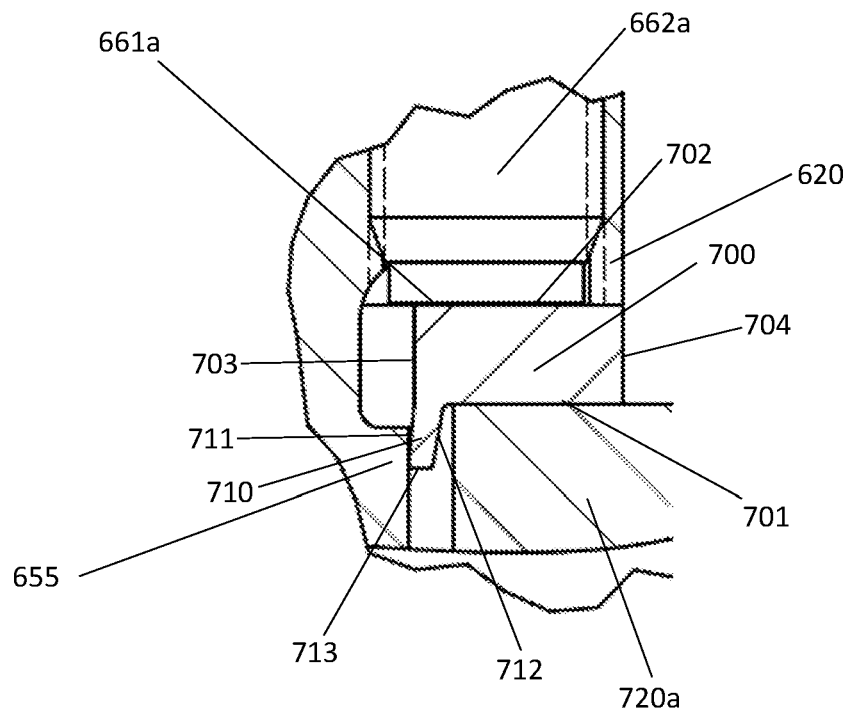
FIG. 8 shows an expanded cross-sectional view of A in FIG. 7.

FIG. 8 shows an expanded cross-sectional view of the interface between the flange 720*a*, the load bearing member 700 and the jackbolt 662*a* (namely, an expanded view of 'A' in FIG. 7). As shown in FIG. 8, the load bearing member 700 sits between flange 720*a*, body portion 620 and jackbolt 662*a*. In this regard, the load bearing member 700 abuts the flange 720*a*, the body portion 620 and the jackbolt 662*a*. The load bearing member 700 also abuts the enlarged portion 655 of the elongate member 650.

The load bearing member 700 comprises a first annular face 701 connected to a second annular face 702 by an inner wall 703 and an outer wall 704. The first annular face 701 and second annular face 702 lie in substantially parallel planes. In one embodiment, the first annular face and the second annular face lie in parallel planes. The inner wall 703 has a smaller circumference than the outer wall 704. In one embodiment, the load bearing member has a generally annular body.

The load bearing member 700 further comprises a cylindrical lip 710 projecting from the first annular face 701. The cylindrical lip 710 comprises a wall 711 that is continuous with the inner wall 703. As shown, the wall 711 may suitably slightly project away from the plane of the inner wall 703. That is, the wall 711 extends away from a central longitudinal axis of the aperture defined by the inner wall 703. The cylindrical lip 710 suitably comprises a second wall 712 projecting away from the first annular face 701. The second wall 712 is preferably at an obtuse angle relative to the plane of the first annular face 701 such that it is angled towards the wall 711. It is postulated that this slight change in orientation biases the cylindrical lip 710 towards the enlarged portion 655, in use, and forms a seal therebetween. In one embodiment, a seal is formed between the load bearing member and the elongate fastening member or stud thereof. The wall 711 and second wall 712 may be connected by a surface 713. It will be appreciated that wall 711 and second wall 712 may meet at an apex. However, it is preferred that wall 711 and second wall 712 be connected by surface 713 as this provide further structural integrity to the cylindrical lip 710.

A disadvantage with some prior art load bearing members is that they may shift or move when force is applied. This shifting of the load bearing member can lead to weak spots in the seal. The cylindrical lip 710 acts as a locating feature for the load bearing member 700 with respect to the elongate fastening member 650 (and enlarged portion 655 thereof) and the aperture in the workpiece. This alleviates the issue of the load bearing member 710 being offset when a force is applied.

The cylindrical lip 710 is also sized and dimensioned such that it abuts enlarged portion 655 and forms a seal therebetween. It will be appreciated that the cylindrical lip 710 extends all the way around enlarged portion 655 and provides a seal therebetween. It will be appreciated that the lip 710 forms a seal with the enlarged portion 655 about the entire circumference thereof. The seal between the load bearing member 700 and the enlarged portion 655 provides another barrier between the internal volume escaping between any compromises in a seal between the load bearing member 700 and the body portion 620 and between the jackbolt 662 and the corresponding jackbolt hole 660.

Figure 9:
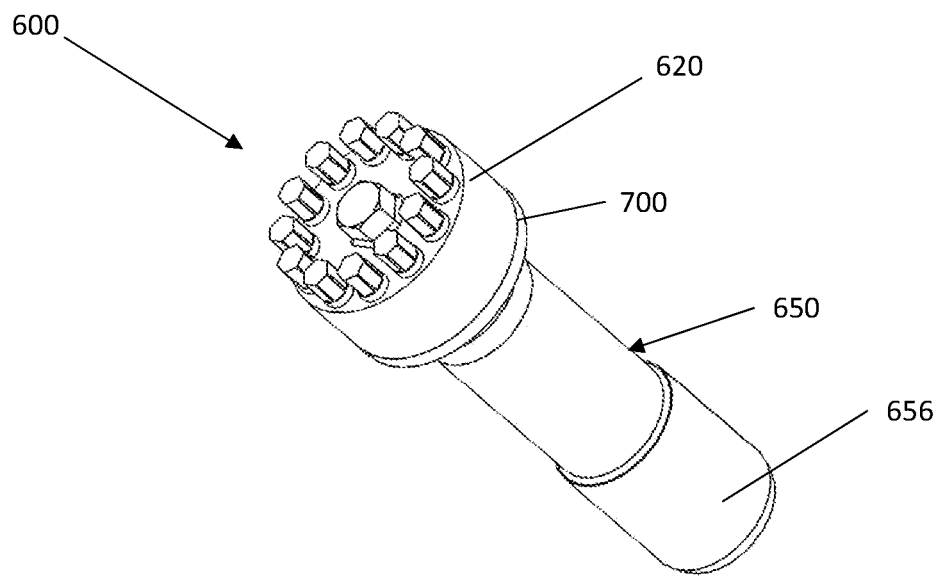
FIG. 9 shows a perspective view of the MJT shown in FIG. 6.

Shown in FIG. 9 is a perspective view of the MJT 600 shown in FIG. 6. The MJT 600 comprises a body portion 620, load bearing member 700 and elongate fastening member 650 as discussed hereinabove. A distal end of the elongate member 650 is provided with a male threaded portion 656. The male threaded portion 656 has a larger diameter than the shank 652. The male threaded portion 656 is adapted to receive a bolt and optionally a washer (not shown) which is captured on an outside of a second workpiece.

In one embodiment, the load bearing member further comprises a concentric protrusion. In an embodiment, the concentric protrusion projects from the first annular face. That is, the load bearing member comprises a protrusion that is located between the inner wall and outer wall such that a protrusion circular in shape in formed therebetween. In certain embodiments, the concentric protrusion is not centrally disposed between the inner wall and outer wall.

In another embodiment, the concentric protrusion projects from the second annular face. That is, the load bearing member comprises a protrusion that is located between the inner wall and outer wall such that a protrusion circular in shaped is formed therebetween. In certain embodiments, the concentric protrusion is not centrally disposed between the inner wall and outer wall. In one embodiment, the concentric protrusion is disposed adjacent the inner wall. In other embodiments, the concentric protrusion is disposed adjacent the outer wall.

The concentric protrusion allows the load bearing member to twist slightly when jackbolts apply pressure thereto. It is postulated that this forms a tighter seal therebetween.

Figure 10:
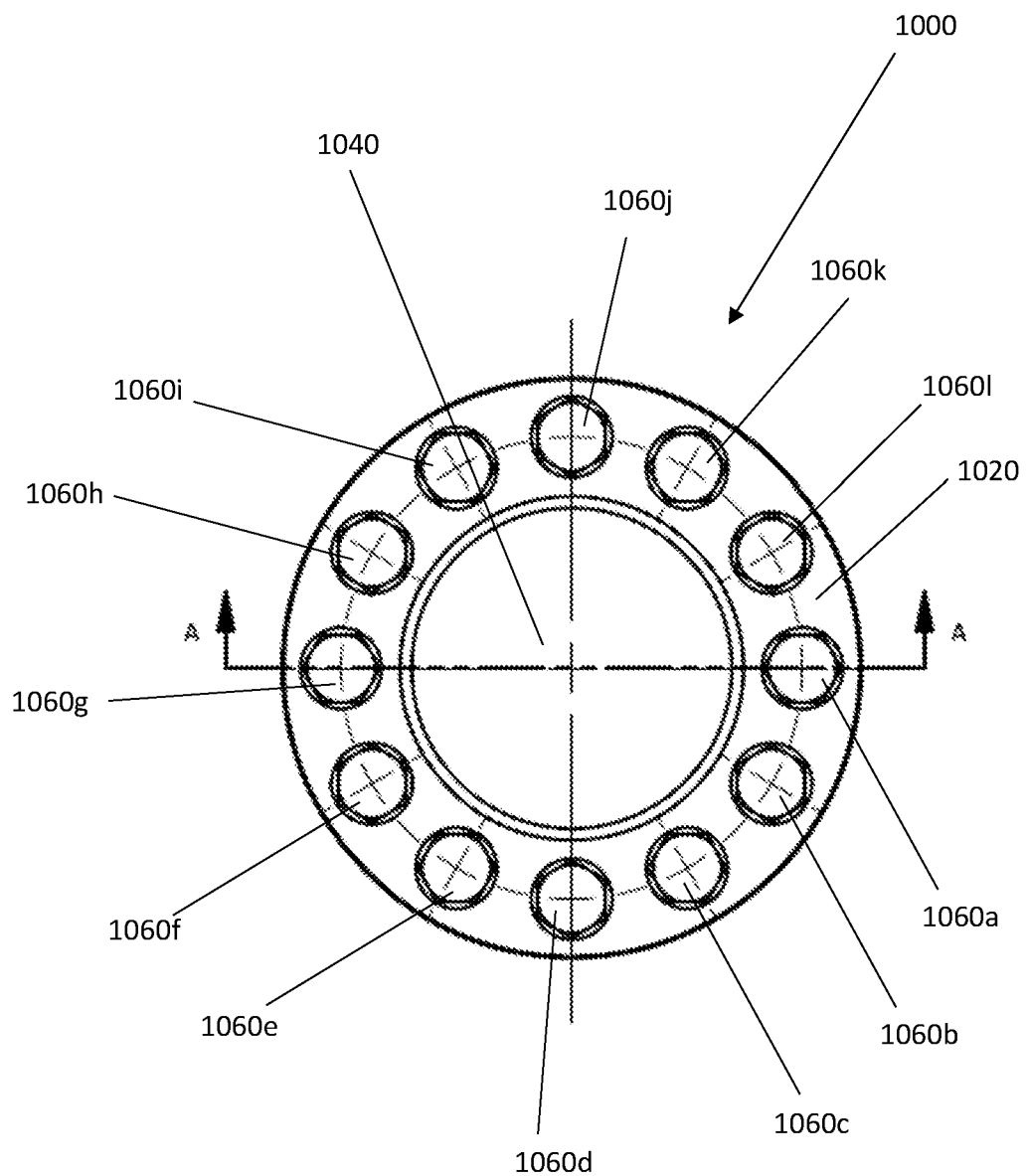
FIG. 10 shows a top plan view of another embodiment of the MJT.

FIG. 10 shows a top plan view of another exemplary MJT. MJT 1000 is similar to MJT 600 with the exception that the elongate fastening member is received in an aperture traversing the body portion.

MJT 1000 comprises a body portion 1020. The body portion 1020 is an annular body portion. The body portion 1020 comprises a circular threaded aperture 1040 formed therethrough to receive an elongate fastening member (not shown). The elongate fastening member suitably has a threaded body which engages with the circular threaded aperture 1040. The diameter of the circular threaded aperture 1040 is suitably equal to the diameter of a threaded body of the elongate fastening member.

The body portion 1020 is formed with a concentric circular array of threaded jackbolt holes 1060a-l therethrough. Through each of the threaded jackbolt holes 1060a-l passes a corresponding one of a plurality of jackbolts 1062a-l. In the embodiment shown, there are twelve (12) jackbolts 1062a-l and twelve (12) corresponding jackbolt holes 1060a-l.

Figure 11:
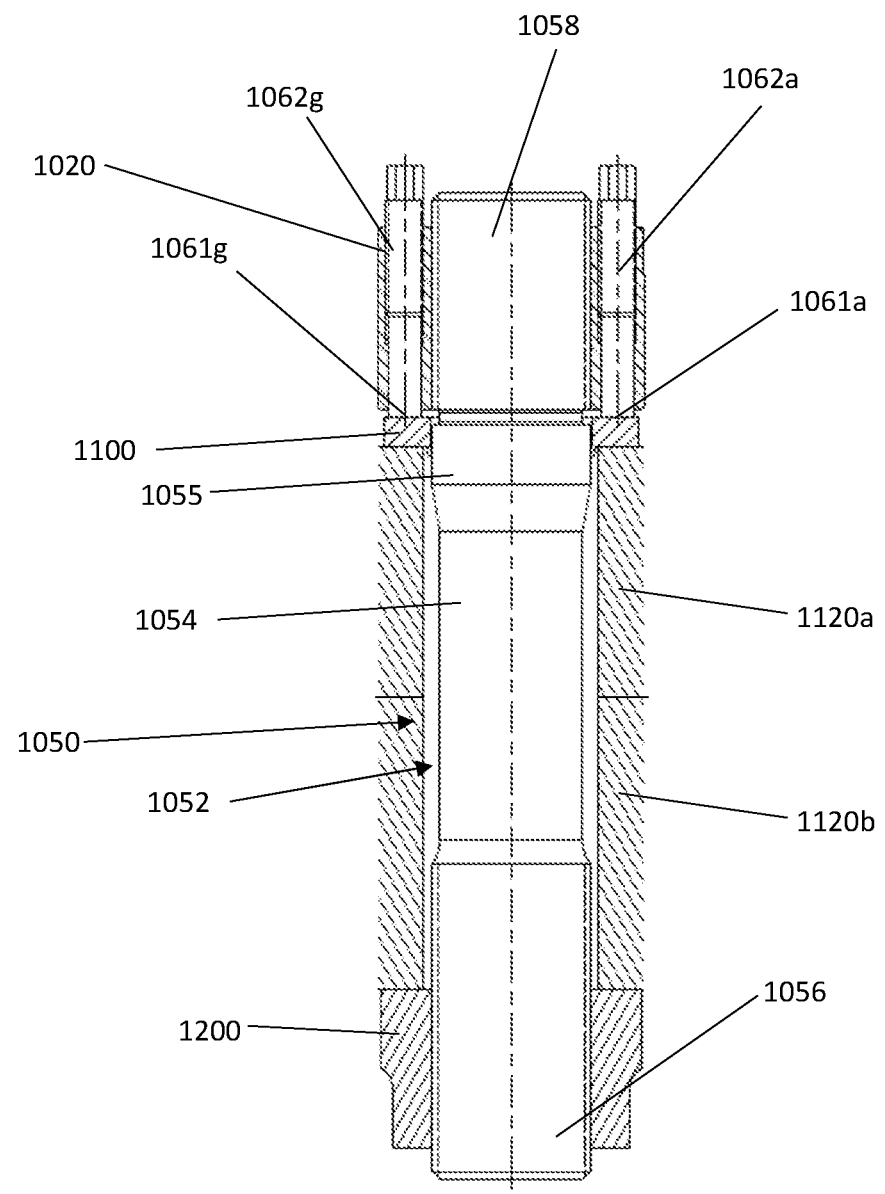
FIG. 11 shows a cross sectional view through line A-A of the MJT depicted in FIG. 10.

A partially cutaway cross-sectional view through the line A-A of MJT 1000 is shown in FIG. 11. The body portion 1020 sits upon a load bearing member 1100. In one embodiment, the body portion abuts the load bearing member. The load bearing member 110 sits upon a flange 1120a of a first workpiece. The flange 1120a sits upon a flange 1120b of a second workpiece. In one embodiment, the load bearing member abuts a flange of a first workpiece. Jackbolts 1062a and 1062g are inserted through respective threaded jackbolt holes 1060a and 1062g in the body portion 1020. The jackbolts 1062a and 1062g comprise a male thread which engages the female threaded jackbolt holes 1060a and 1060g. As the jackbolt 1062a and 1062g is inserted into their respective jackbolt hole 1060a and 1062g, the jackbolts 1062a and 1062g extend beyond the end of the jackbolt hole 1060a and 1060g. Jackbolts 1062a and 1062g each comprise a respective point 1061a and 1061g which applies a force on the load bearing member 1100. As the jackbolt 1062a and 1062g is tensioned in the jackbolt hole 1060a and 1060g, the respective point applies force to the load bearing member 1100. The load bearing member 1100 in turn applies a force on the workpieces.

The load bearing member 1100 is as substantially described for load bearing member 700 described hereinabove.

The elongate fastening member 1050 comprises a stud 1052 comprising a shank 1054. The shank 1054 comprises an enlarged portion 1055 and a threaded portion 1056. The enlarged portion 1055 has a larger diameter than the remaining portion of the shank 1054. The threaded portion 1056 has a larger diameter than the shank 1054. The threaded portion 1056 is adapted to receive a bolt 1200 which is captured on an outerside of the second workpiece 1120b. The elongate fastening member 1050 further comprises a male threaded body 1058 which engages with the circular female threaded aperture 1040 of body portion 1020. The male threaded body 1058 is located at a distal end of the elongate fastening member 1050. The threaded body 1058 is connected to enlarged portion 1055. The diameter of the threaded body 1058 is suitably equal to the diameter of the circular threaded aperture 1040. That is, the threaded body 1058 is complementary to the circular female threaded aperture 1040.

As shown, load bearing member 1100 similarly forms a seal between the first workpiece 1120a and the stud 1054. Given that MJT 1000 comprises the elongate fastening member 1050 as a distinct separate component, this seal further prevents gas release from the interface between elongate fastening member 1050 and circular threaded aperture 1040 of body portion 1020; in addition to the interface between the load bearing member 1100 and body portion 1020, the interface between the load bearing member 1100 and workpiece 1120a, and the interface between the jackbolt and the jackbolt holes.

Figure 12:
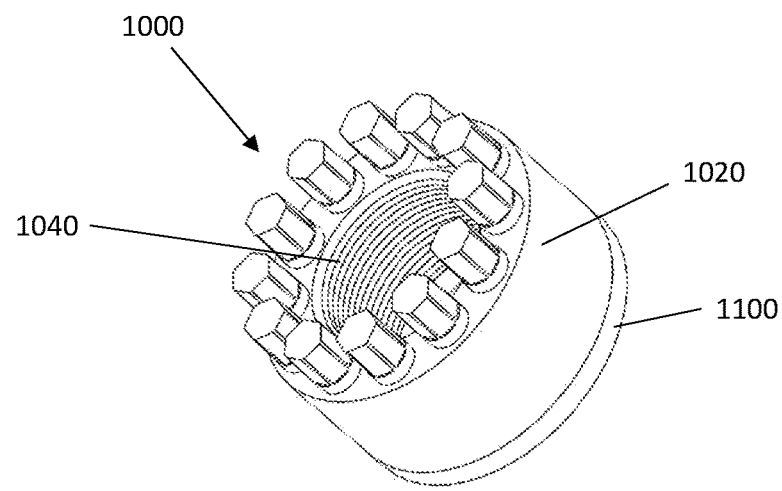
FIG. 12 shows a perspective view of the MJT shown in FIG. 10.

Shown in FIG. 12 is a perspective view of the MJT shown in FIG. 10. Please note that the elongate fastening member is not shown.

Figure 14:
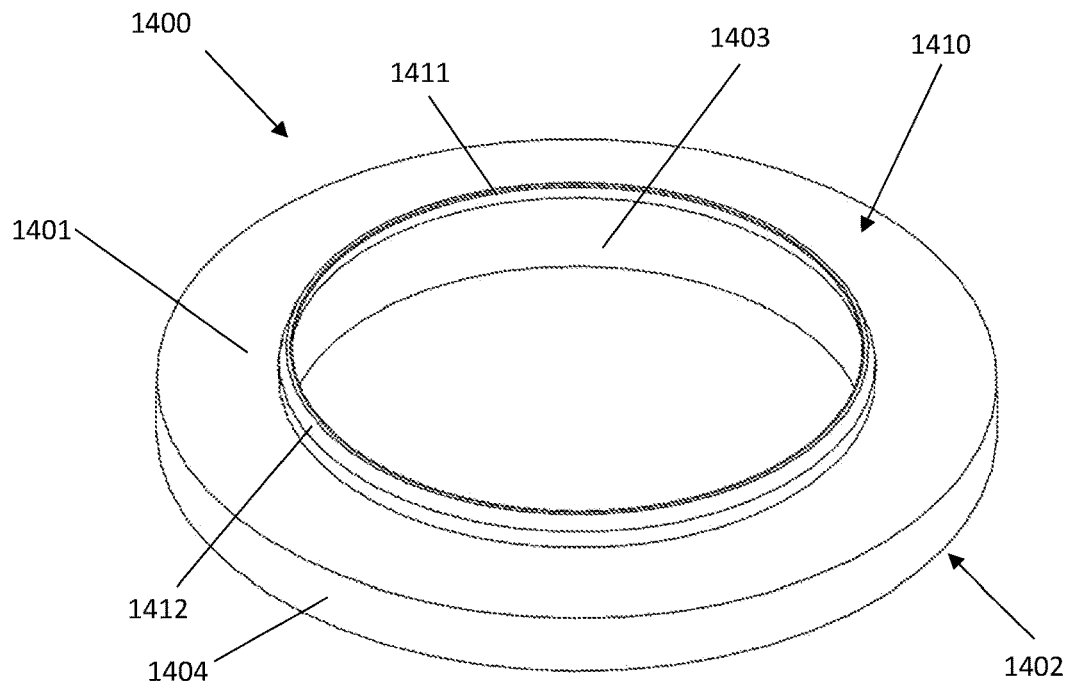
FIG. 14 shows a top perspective view of a load bearing member.
Figure 15:
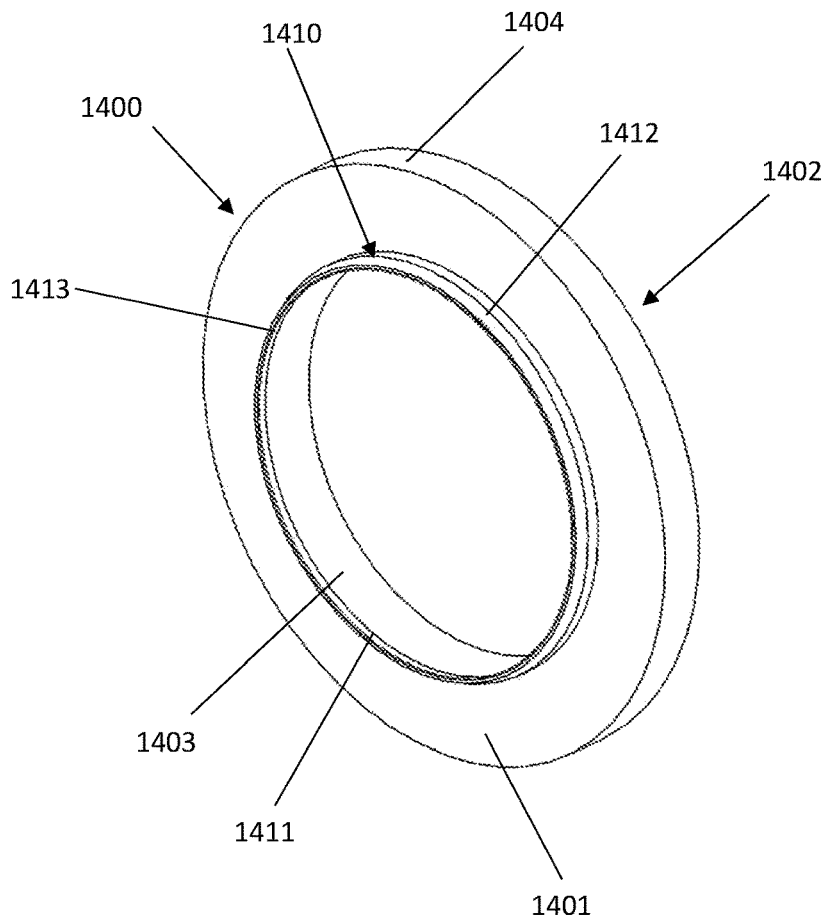
FIG. 15 shows a side perspective view of the load bearing member of FIG. 14.

Shown in FIG. 14 is a top perspective view of a load bearing member, and shown in FIG. 15 is a side perspective view of the load bearing member. The load bearing member 1400 comprises a first annular face 1401 connected to a second annular face 1402 by an inner wall 1403 and outer wall 1404. The first annular face 1401 and second annular face 1402 lie in substantially parallel planes. In one embodiment, the first annular face 1401 and the second annular face 1402 lie is parallel planes. The inner wall 1403 has a smaller circumference than the outer wall 1404. In the embodiment shown, the loading bearing member 1400 has a generally annular body.

The load bearing member 1400 further comprises a cylindrical lip 1410 projecting from the first annular face 1401. The cylindrical lip 1410 comprises a wall 1411 that is continuous with the inner wall 1403. That is, the wall 1411 extends away from a central longitudinal axis of the aperture defined by the inner wall 103. In a preferred embodiment, the aperture is sized and dimensioned to receive the above-mentioned elongate fastening member. The wall 1411 may project slightly away from the plane of the inner wall 1403. The cylindrical lip 1410 comprises a second wall 1412 projecting away from the first annular face 1401. The second wall 1412 is at an obtuse angle relative to the plane of the first annular face 1401 such that it is angled towards wall 1411. It is postulated that this slight change in orientation biases the cylindrical lip 1410 towards a stud (in use) to form a seal therebetween. The wall 1411 and second wall 1412 may be connected by a surface 1413. It is postulated that this surface 1413 provides further structural integrity to the cylindrical lip.

In use with the body portion that is not integrally formed with the elongate fastening member, the cylindrical lip is adapted to form a seal with the first workpiece, the body portion, the jackbolt and/or the elongate fastening member (where applicable). In some embodiments, the cylindrical lip is adapted to form a seal with the first workpiece. In embodiments, the cylindrical lip is adapted to form a seal with the body portion. In an embodiment, the cylindrical lip is adapted to form a seal with the jackbolt(s). In one embodiment, the cylindrical lip is adapted to form a seal with the elongate fastening member.

In use with an integrally formed elongate fastening member with the body portion, the cylindrical lip is adapted to form a seal with a first workpiece and/or the elongate fastening member. In embodiments, the cylindrical lip is adapted to form a seal with the first workpiece. In one embodiment, the cylindrical lip is adapted to form a seal with the elongate fastening member.

Figure 19:
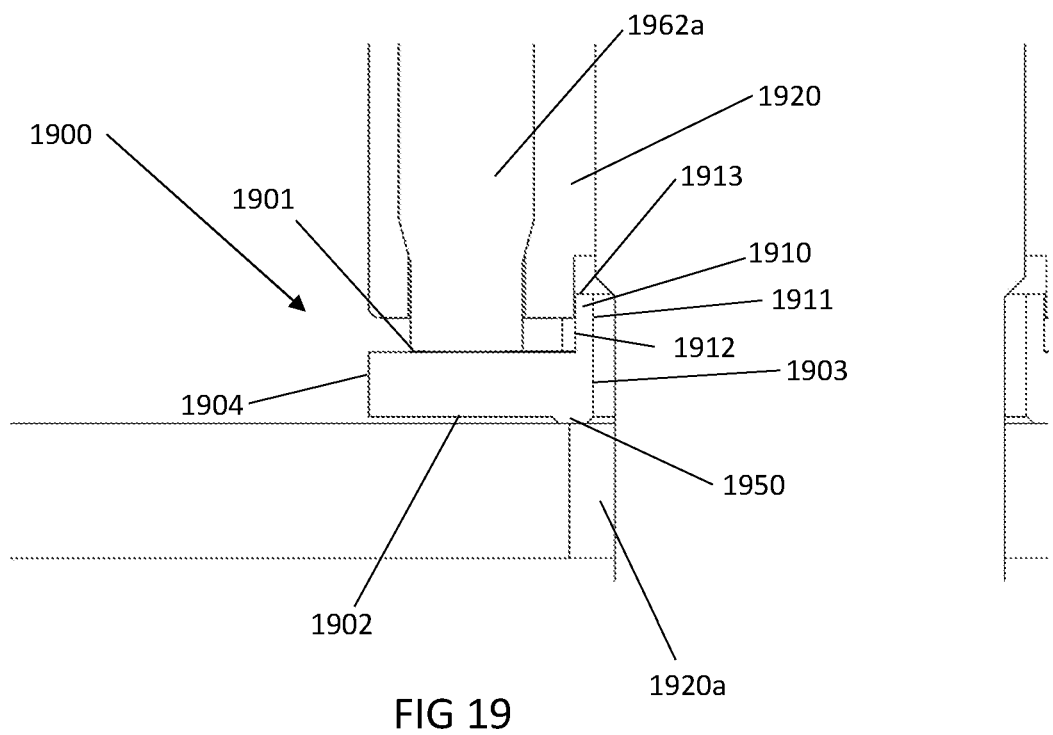
FIG. 19 shows are a cross-section of an embodiment of a load bearing member with an exemplary MJT with little or no pressure applied by the jackbolt.
Figure 20:
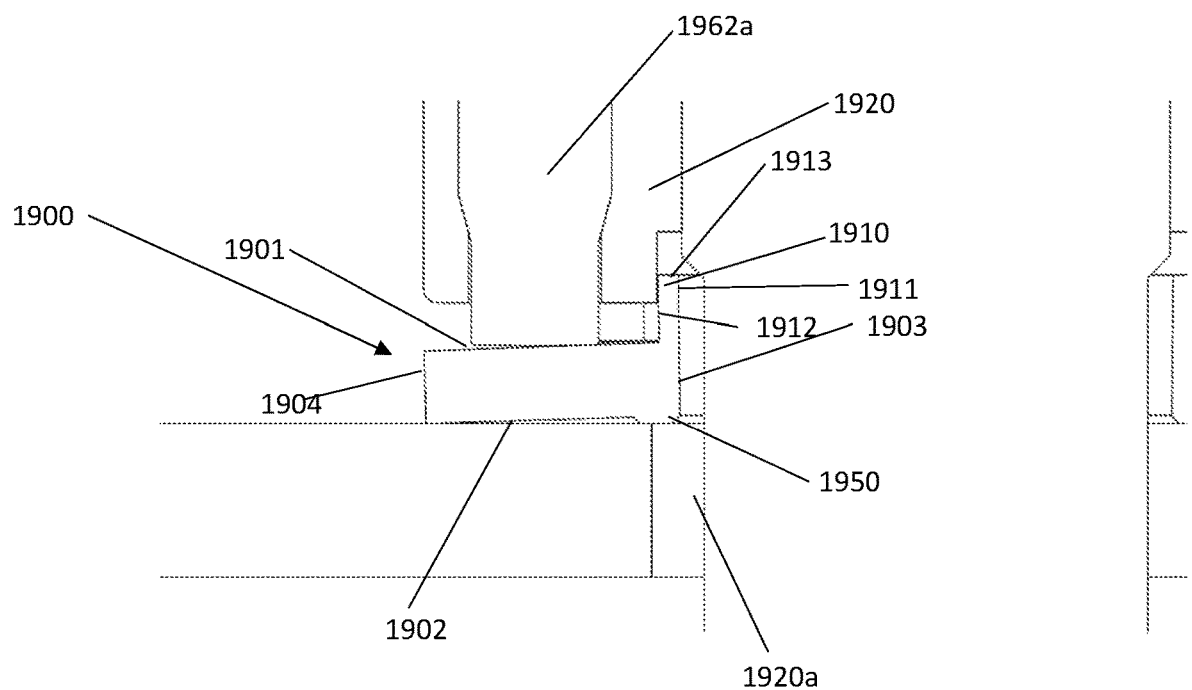
FIG. 20 shows the embodiment shown in FIG. 19 with pressure being applied to the load bearing member by the jackbolt.

The invention has been described hereinabove in relation to the load bearing member with the cylindrical lip protrusion which abuts a flange. However, it will be appreciated that the loading bearing member may be utilized in the opposite orientation wherein the cylindrical lip protrusion engages the body of a MJT to form a seal therebetween. This embodiment is shown in FIGS. 19 and 20. In one embodiment, the cylindrical lip is adapted to form a seal with the body portion.

Furthermore, the non-centrally disposed concentric protrusion between the inner wall and outer wall allows for further seal(s) to be formed between a flange and the load bearing member. Shown in FIGS. 19 and 20 are a cross-section of an embodiment of a load bearing member 1900 with an exemplary MJT.

The load bearing member 1900 comprises a first annular face 1901 connected to a second annular face 1902 by an inner wall 1903 and outer wall 1904. The first annular face 1901 and second annular face 1902 lie in substantially parallel planes. In one embodiment, the first annular face 1901 and the second annular face 1902 lie in parallel planes. The inner wall 1903 has a smaller circumference than the outer wall 1904. In the embodiment shown, the loading bearing member 1900 has a generally annular body.

The load bearing member 1900 further comprises a cylindrical lip 1910 projecting from the first annular face 1901. The cylindrical lip 1910 comprises a wall 1911 that is continuous with the inner wall 1903. The cylindrical lip 1910 suitably comprises a second wall 1912 projecting away from the first annular face 1901. The wall 1911 and second wall 1912 may be connected by a surface 1913. It will be appreciated that wall 1911 and second wall 1912 may meet at an apex. However, it is preferred that wall 1911 and second wall 1912 be connected by surface 1913 as this provide further structural integrity to the cylindrical lip 1910. In one embodiment, the cylindrical lip 1910 is adapted to form a seal with a body portion.

The load bearing member 1900 further comprises a concentric protrusion 1950. The concentric protrusion 1950 extends away from the second annular face 1902. Preferably, the concentric protrusion is located adjacent the inner wall 1903. In another embodiment, the concentric protrusion is located adjacent the outer wall 1904.

Shown in FIG. 19, a body portion 1920 sits upon the load bearing member 1900. In one embodiment, the body portion abuts the load bearing member. The load bearing member 1900 sits upon a flange 1920a of a first workpiece. In an embodiment, the load bearing member abuts a flange of the first workpiece. The flange 1920a sits on top of a flange of a second workpiece (not shown). A jackbolt 1962a is inserted through a threaded jackbolt hole in the body 1920. FIG. 19 shows the jackbolt 1962a in contact with the first annular face 1901 of the load bearing member 1900. The cylindrical lip 1910 is positioned such that it contacts the body 1920 to form a seal therebetween. It should be noted that very little or substantially no pressure is applied on the load bearing member 1900 by the jackbolt 1962a in FIG. 19. As shown, the concentric protrusion 1950 engages the flange 1920a.

FIG. 20 shows the arrangement of FIG. 19 with the exception that pressure is applied by the jackbolt 1962a onto the load bearing member 1900. As pressure is applied onto the load bearing member 1900, a seal is formed between the concentric protrusion 1950 and the flange 1920a. Furthermore, the applied pressure causes the load bearing member 1900 to contact the flange 1920a at a second location. As shown, a part of the second annular face 1902 adjacent the outer wall 1904 is caused to contact the flange 1920a and a seal is formed therebetween. As such, the use of a concentric protrusion 1950 further allows for a pair of seals to be formed to alleviate the problem of gas escaping.

In the embodiment shown in FIGS. 19 and 20, the body portion 1920 is provided with a recess that accommodate the cylindrical lip 1910. The cylindrical lip 1910 forms a seal with the recess of the body portion 1920.

It will be appreciated that the formation of additional seals will occur if the concentric protrusion is not centrally located between the inner wall and the outer wall. In one embodiment, the concentric protrusion is located adjacent the inner wall. In another embodiment, the concentric protrusion is located adjacent the outer wall.

It will be appreciated that the cylindrical lip is adapted to form a seal with a first workpiece and the body portion. In some embodiments, the cylindrical lip is adapted to form a seal with the first workpiece. In embodiments, the cylindrical lip is adapted to form a seal with the body portion. In one embodiment, the cylindrical lip is adapted to form a seal with the elongate fastening member.

In another form, the invention resides in a method of compressing a first workpiece and a second workpiece together including the steps of:
  locating a load bearing member on the first workpiece, the load bearing member comprising a first annular face connected to a second annular face by an inner wall and an outer wall, and a cylindrical lip projecting from the first annular face, wherein the cylindrical lip comprises a wall that is continuous with the inner wall;
  locating a body portion on the load bearing member, wherein the body portion engages an elongate fastening member or is integrally formed therewith, the body portion having a plurality of holes spaced uniformly from a longitudinal central axis at spaced apart locations about an outer periphery thereof, the holes having sidewalls formed with body threads,
  capturing the elongate fastening member on an outer side of the second workpiece;
  coupling jackbolts including a body having threads to threadedly engage the body threads in each of the holes in the body portion;
  tensioning the jackbolts,
to thereby compress the first and second workpieces towards each other.

The MJT, body portion, jackbolt and load bearing member may be substantially as described hereinabove.

In operation, a multi jackbolt tensioner comprises a body portion formed to engage an elongate fastening member or integrally formed therewith. The elongate fastening member is typically passed through an aperture in a first workpiece and a second workpiece (for instance, flanges). The distal end of the elongate fastening member is suitably captured on an outer side of the second workpiece. The elongate fastening member may be captured by a bolt with optionally a washer. The elongate fastening member may comprise a stud and/or shank that extends through the first and second workpiece.

The load bearing member is located on the first workpiece, and the body portion of the multi jackbolt tensioner is located thereon. Jackbolts each having a body that have male threads to threadingly engage female body threads in holes in the body portion are inserted and coupled thereto. As the jackbolts are tensioned, pressure is applied therefrom onto the load bearing member and thus the first and second workpieces. This pressure results in compressive pressure being applied on the first and second workpieces.

In one embodiment, the method further includes the step of applying hydraulic pressure to compress the first workpiece and the second work piece. The method further includes the step of releasing the hydraulic pressure after the tensioning jackbolts step.

In one embodiment, the method further includes the step of forming a seal between the cylindrical lip with the first work piece, the body portion, the jackbolt and/or the elongate fastening member. In some embodiments, the method further includes the step of forming a seal between the cylindrical lip and the first workpiece. In certain embodiments, the method further includes the step of forming a seal between the cylindrical lip and the jackbolt(s). In embodiments, the method further includes the step of forming a seal between the cylindrical lip and the elongate fastening member. In some embodiments, the method further includes the step of forming a seal between the cylindrical lip and the body portion.

Figure 13:
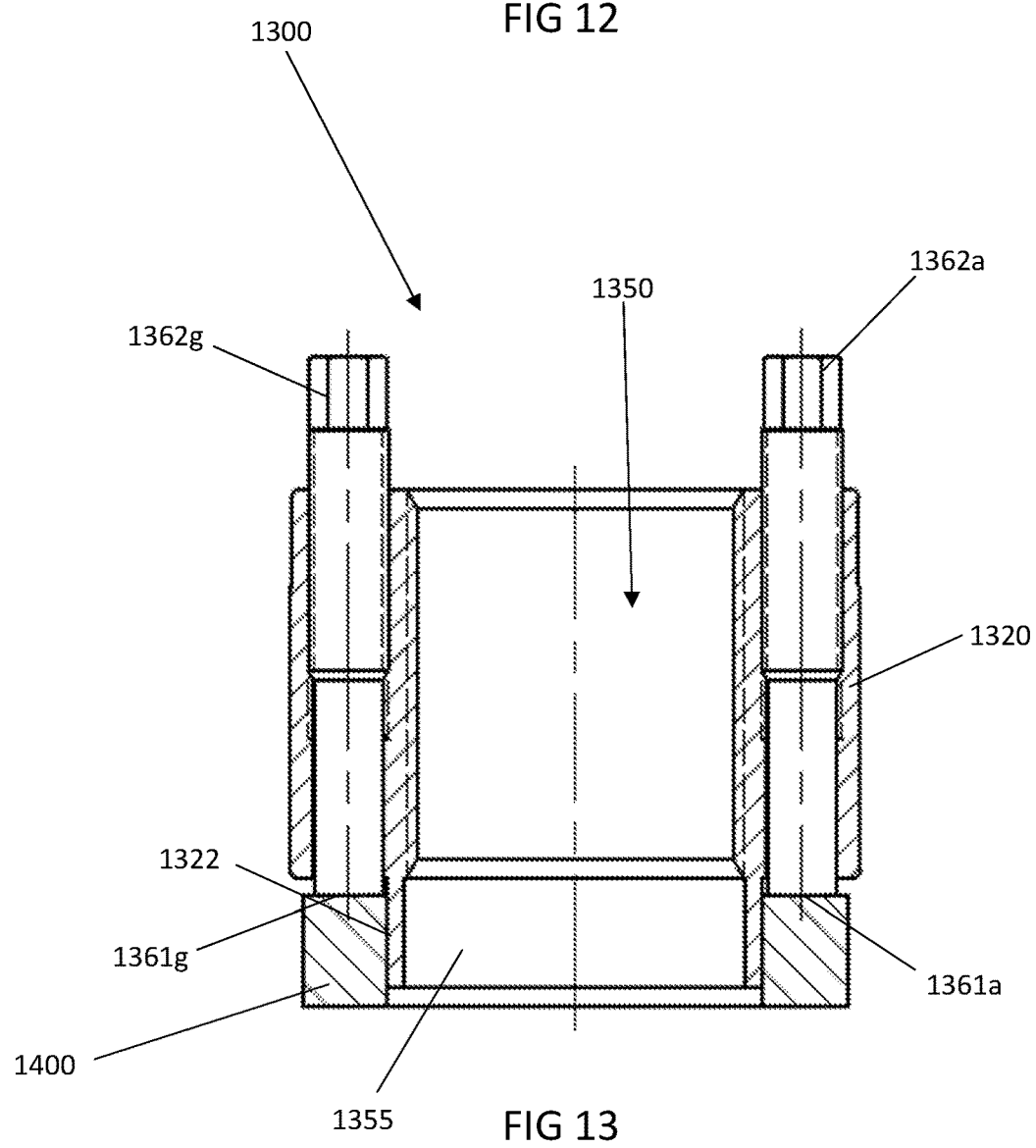
FIG. 13 shows an alternate embodiment of the MJT.

It will be appreciated by the person skilled in the art that the features of the cylindrical lip may be formed on the base of the body portion of the MJT. In this regard, FIG. 13 shows an alternative embodiment a MJT where a cylindrical lip is formed on the base of the body portion thereof. FIG. 13 shows a cross-sectional view of MJT 1300.

MJT 1300 comprises a body portion 1320. The body portion 1320 is suitably an annular body portion, such as those mentioned hereinabove. The body portion 1320 comprises a circular thread aperture (not shown) formed therethrough to receive an elongate fastening member 1350.

The body portion 1320 may be formed with a concentric circular array of threaded jackbolt holes there through. Through each of the threaded jackbolt holes passes a corresponding one of a plurality of jackbolts. Shown in FIG. 13 are two jackbolts 1362a and 1362g inserted through a respective threaded jackbolt hole. The jackbolts 1362a and 1362g comprise a male thread which engage with the corresponding female threaded jackbolt hole. As the jackbolt 1362a and 1362g is inserted into the jackbolt hole, the jackbolt 1362a and 1362g extends beyond the end of the jackbolt hole. The jackbolt 1362a, 1362g suitably comprises a points 1361a, 1361g which apply a force onto a load bearing member 1400.

In this embodiment, load bearing member 1400 is an annular load bearing member. In another embodiment, the load bearing member 1400 is in the form of an annular washer.

The underside of the base of the body portion 1320 is provided with a cylindrical lip protrusion 1322. The cylindrical lip protrusion 1322 is sized and dimensioned such that it locates between the load bearing member 1400 and an enlarged portion 1355 of a shank of the elongate fastening member 1350. In this regard, the cylindrical lip protrusion forms a seal with the enlarged portion and/or the load bearing member. In one embodiment, the cylindrical lip protrusion forms a seal with the enlarged portion. In an embodiment, the cylindrical lip protrusion forms a seal with the load bearing member. The cylindrical lip protrusion is sized and dimensioned such that, in use, it forms a seal between the load bearing member 1400 and enlarged portion 1355.

The cylindrical lip protrusion 1322 forms a seal between the load bearing member 1400 and the enlarged portion 1355. It will be appreciated that the cylindrical lip protrusion 1322 achieves a similar function to the loading bearing members described in the previous embodiments. The cylindrical lip protrusion 1322 also assists to maintain the load bearing member 1400 is the desired location/position.

It will be appreciated that abovementioned MJT may also be utilized with hydraulic tensioner. In this regard, a hydraulic tensioner may be utilized to apply compressive pressure against the first workpiece and second work piece. The jackbolts can then be tensioned such that the applied hydraulic pressure is maintained, and then the hydraulic pressure may be released and the hydraulic tensioner removed.

It will be appreciated that the cylindrical lip is adapted to form a seal with a first workpiece and/or the elongate fastening member. In some embodiments, the cylindrical lip is adapted to form a seal with the first workpiece. In one embodiment, the cylindrical lip is adapted to form a seal with the elongate fastening member.

It will be appreciated that the cylindrical lip of either the load bearing member or the body portion provides further seals that alleviate the issue of loss of pressure. In this regard, the seals formed by the cylindrical lip of the load bearing member or the body portion (and the load bearing member or the body portion, respectively) provide a further back-up to loss of seal. This is a significant advantage over the prior art MJTs.

In another form, the invention resides in a method of compressing a first workpiece and a second workpiece together including the steps of:
  locating an annular load bearing member on the first workpiece,
  locating a body portion on the load bearing member, wherein the body portion is formed to engage an elongate fastening member or integrally formed therewith, the body portion having a plurality of holes spaced uniformly from a longitudinal central axis at spaced apart locations about an outer periphery thereof, the holes having sidewalls formed with body threads, wherein an underside of a base of the body portion comprises a cylindrical lip protrusion that abuts the annular load bearing washer,
  capturing the elongate fastening member on an outer side of the second workpiece;
  coupling jackbolts including a body having threads to threadedly engage the body threads in each of the holes in the body portion;
  tensioning the jackbolts,
to thereby compress the first and second workpieces towards each other.

The body portion, jackbolt and load bearing member may be substantially as described hereinabove.

In one embodiment, the method further includes the step of forming a seal between the cylindrical lip protrusion and the enlarged portion and/or the load bearing member. In one embodiment, the method further includes the step of forming a seal between the cylindrical lip protrusion and the enlarged portion. In an embodiment, the method further includes the step of forming a seal between the cylindrical lip protrusion and the load bearing member.

As previously mentioned, the MJTs mentioned hereinabove are suitably utilized in high fluid pressure environments (such as gas turbines). One issue with these high fluid pressure environments is uneven adjacent surfaces in the turbines. These interfaces can lead to a loss of seal. One solution to this issue is to seal adjacent surfaces by installing a seal. The seal may be formed of a metal insert. The metal insert is suitably installed before sealing with the MJTs mentioned hereinabove. The metal inserts may suitably be welded in place prior to the tensioning of the MJTs.

The metal insert may be dimensioned such that it fits tightly in between the adjacent surfaces.

In one embodiment, the invention resides in a method of sealing a gas turbine including the steps of:
  placing a metal insert over adjacent surfaces in the gas turbine; and
  compressing the adjacent surfaces by tensioning one or more MJTs mentioned herein;
to thereby seal a gas turbine.

The method may further include the step of dimensioning the metal insert such that it fits tightly between the adjacent surfaces.

The method may further include the step of welding the metal insert to the adjacent surfaces. The tensioning of the one or more MJTs may be substantially as described hereinabove. In one embodiment, the step of compressing the adjacent surfaces includes utilizing the MJTs mentioned hereinabove.

The metal insert will be compressed as the MJT is tensioned and form a tight seal therebetween. Preferably, the compressed metal insert will form a gastight seal between the adjacent surfaces. It is postulated that the use of the metal insert provides a further barrier to loss of seal in high fluid pressure environments.

Figure 16:
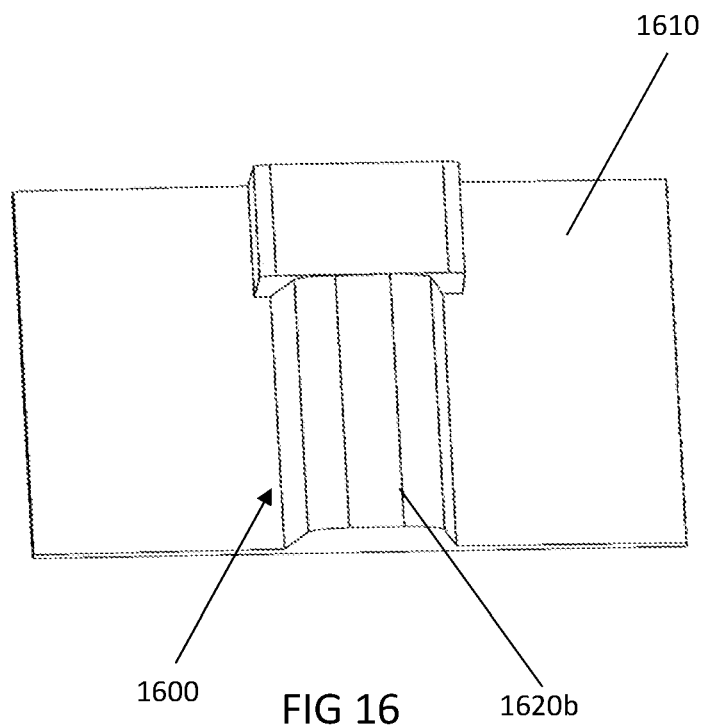
FIG. 16 shows a bottom view of a metal insert.
Figure 17:
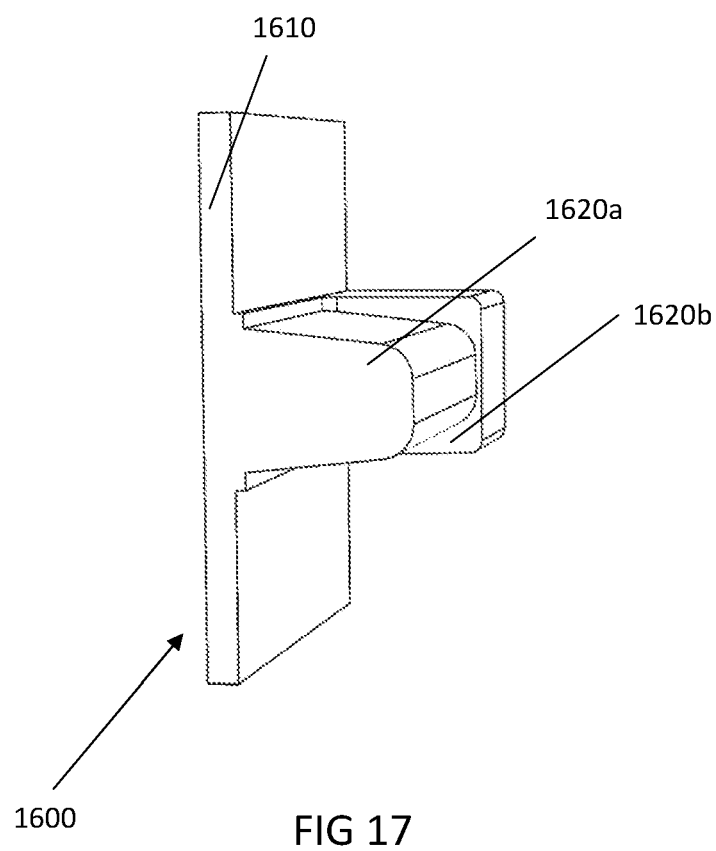
FIG. 17 shows a side view of the metal insert of FIG. 16.

Shown in FIGS. 16 and 17 is an embodiment of the metal insert 1600. In one embodiment, the metal insert comprises a substantially flat body 1610 with one or more projections 1620a, 1620b extending from a face thereof. The one or more projections 1620a, 1620b are preferably spaced apart. In one embodiment, the metal insert is integrally formed. Suitably, the one or more projections are generally centrally located between ends of the substantially flat body. This allows for the metal insert to be cut or dimensioned to tightly fit between adjacent surfaces. In one embodiment, the junction between the one or more projections 1620a, 1620b are reinforced at the point where they meet the substantially flat body 1610 (as shown in the figures).

It will be appreciated that gaps may be present in adjacent surfaces and these gaps may have different dimensions. The metal insert allows for these gaps to be accommodated by allowing a user to dimension the metal insert such that they fit tightly between adjacent surfaces. For instance, the substantially flat body 1610 may be cut to the desired size. Furthermore, it is postulated that the one or more projections provide a degree of flex when being inserted into a gap.

Figure 18:
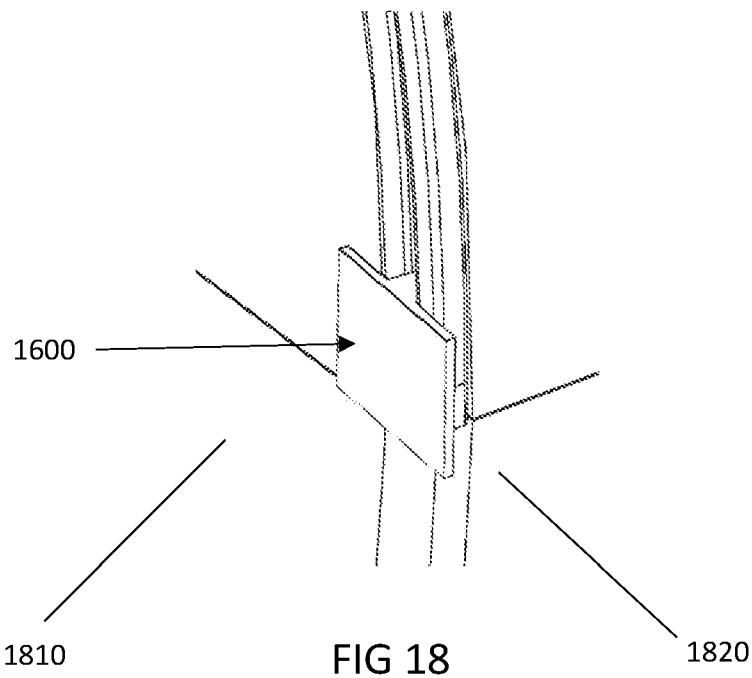
FIG. 18 shows a dimensioned metal insert welded to a surface.

Shown in FIG. 18 is an embodiment of a dimensioned metal insert 1600 welded to at least one of the adjacent surfaces 1810, 1820. As shown, the metal insert has had the substantially flat body dimensioned to the desired size. In the embodiment shown, dimensioned metal insert 1600 is welded to adjacent surface 1820.

Any documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

Furthermore, any references to methods, apparatus or documents of the prior art are not to be taken as constituting any evidence or admission that they formed, or form part of the common general knowledge.

While particular embodiments have been illustrated and described, it would be obvious to those skilled in the art that various other changes and modifications can be made without departing from the spirit and scope of the invention. Those skilled in the art will recognize, or be able to ascertain using no more than routine experimentation, numerous equivalents to the specific apparatuses and methods described herein, including alternatives, variants, additions, deletions, modifications and substitutions.

This application including the appended claims is therefore intended to cover all such changes and modifications that are within the scope of this application.

What is claimed is:

1. A multi jackbolt tensioner comprising:
   a body portion formed to engage an elongate fastening member or integrally formed therewith, the body portion having a plurality of holes spaced uniformly from a longitudinal central axis at spaced apart locations about an outer periphery thereof, the holes having sidewalls formed with body threads;
   jackbolts each including a body having threads to threadedly engage the body threads in one of the holes in the body portion; and
   a load bearing member for applying force to a workpiece to be fastened and arranged for locating about the elongate fastening member, wherein the load bearing member comprising a first annular face connected to a second annular face by an inner wall and an outer wall, and a cylindrical lip projecting from the first annular face, wherein the cylindrical lip comprises a wall that is continuous with the inner wall, wherein the cylindrical lip is adapted to form a seal with a workpiece being fastened,
   wherein the load bearing member further comprises a concentric protrusion projecting from the second annular face.

2. The multi jackbolt tensioner of claim 1, wherein the wall projects slightly away from a plane of the inner wall.

3. The multi jackbolt tensioner of claim 1, wherein the cylindrical lip comprises a second wall that projects away from the first annular face.

4. The multi jackbolt tensioner of claim 1, wherein the load bearing member further comprises a second concentric protrusion projecting from the second annular face.

5. The multi jackbolt tensioner of claim 1, wherein the cylindrical lip is adapted to form a seal with the first workpiece, the body portion, the jackbolt and/or the elongate fastening member.

6. The multi jackbolt tensioner of claim 1, wherein the cylindrical lip is adapted to form a seal with the elongate fastening member.

7. The multi jackbolt tensioner of claim 1, wherein the cylindrical lip is adapted to form a seal with the body portion.

8. The multi jackbolt tensioner of claim 1, wherein the jackbolts abut the load bearing member.

9. A method of compressing a first workpiece and a second workpiece together including the steps of:
   locating a load bearing member on the first workpiece, the load bearing member comprising a first annular face connected to a second annular face by an inner wall and an outer wall, and a cylindrical lip projecting from the first annular face, wherein the cylindrical lip comprises a wall that is continuous with the inner wall, wherein the cylindrical lip is adapted to form a seal with the first workpiece or the second workpiece, wherein the load bearing member further comprises a concentric protrusion projecting from the second annular face;
   locating a body portion on the load bearing member, wherein the body portion engages an elongate fastening member or is integrally formed therewith, the body portion having a plurality of holes spaced uniformly from a longitudinal central axis at spaced apart locations about an outer periphery thereof, the holes having sidewalls formed with body threads,
   capturing the elongate fastening member on an outer side of the second workpiece;
   coupling jackbolts including a body having threads to threadedly engage the body threads in each of the holes in the body portion;
   tensioning the jackbolts,
   to thereby compress the first and second workpieces towards each other.

10. The method of claim 9, wherein the wall projects slightly away from a plane of the inner wall.

11. The method of claim 9, wherein the cylindrical lip comprises a second wall that projects away from the first annular face.

12. The method of claim 9, wherein the load bearing member further comprises a second concentric protrusion projecting from the second annular face.

13. The method of claim 9, wherein the cylindrical lip is adapted to form a seal with the first workpiece, the body portion, the jackbolt and/or the elongate fastening member.

14. The method of claim 9, wherein the cylindrical lip is adapted to form a seal with the elongate fastening member.

15. The method of claim 9, wherein the cylindrical lip is adapted to form a seal with the body portion.

16. The method of claim 9, wherein the jackbolts abut the load bearing member.

* * * * *

UNITED STATES PATENT AND TRADEMARK OFFICE
CERTIFICATE OF CORRECTION

| | | |
|---|---|---|
| PATENT NO. | : 12,044,264 B2 | Page 1 of 1 |
| APPLICATION NO. | : 18/017350 | |
| DATED | : July 23, 2024 | |
| INVENTOR(S) | : Andrew Duncan McPhee | |

It is certified that error appears in the above-identified patent and that said Letters Patent is hereby corrected as shown below:

On the Title Page

Item (71), please delete "Gallenkappel (CH)" and insert --St. Gallenkappel (CH)--.

In the Specification

Column 14, Line 43, delete "there through." and insert --therethrough.--.

Signed and Sealed this
Twelfth Day of November, 2024

Katherine Kelly Vidal
*Director of the United States Patent and Trademark Office*